April 18, 1967  J. E. MAMBOURG ET AL  3,314,776
APPARATUS FOR CONTINUOUS PRODUCTION OF GLASS SHEETS
Filed March 18, 1963
3 Sheets-Sheet 1
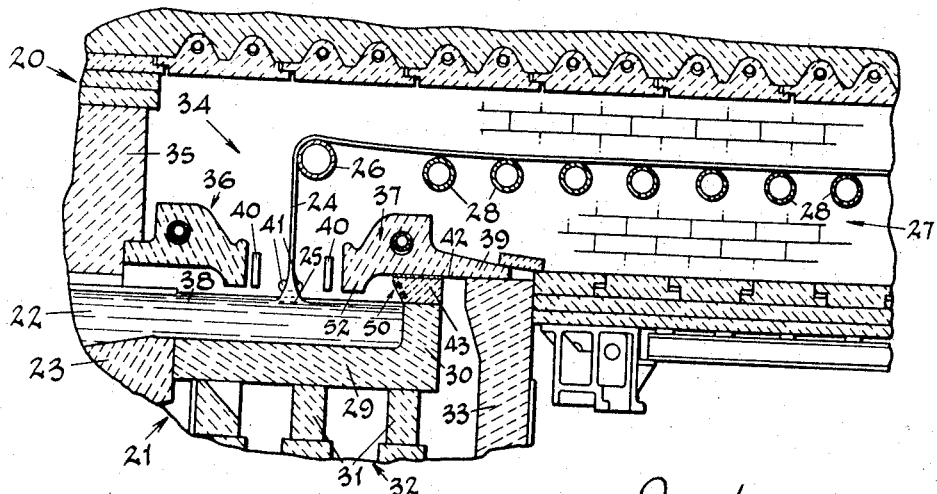
Fig. 1.
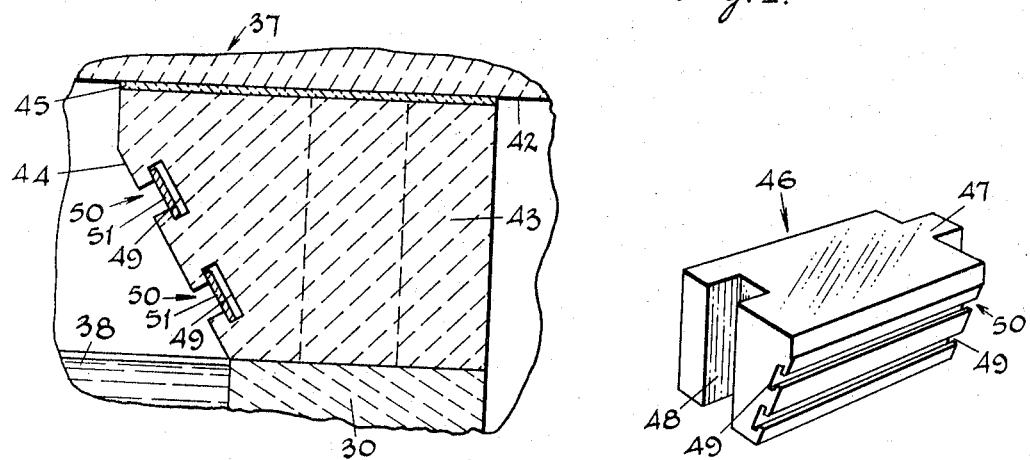
Fig. 2.
Fig. 3.
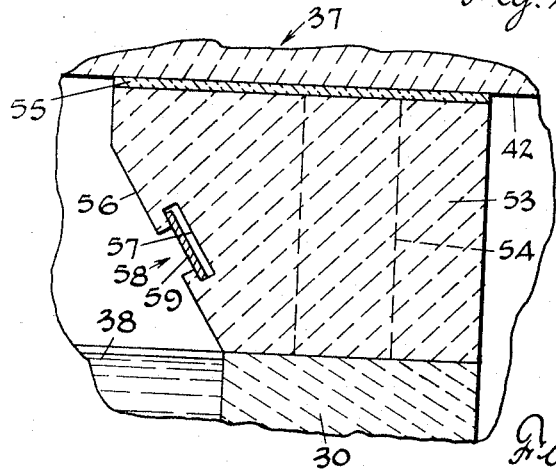
Fig. 4.
INVENTORS
James E. Mambourg and
BY William E. McCown
Nobbe & Swope
ATTORNEYS INVENTORS
James E. Mambourg and
William E. McCown
BY Hobbs & Swope
ATTORNEYS April 18, 1967  J. E. MAMBOURG ET AL  3,314,776
APPARATUS FOR CONTINUOUS PRODUCTION OF GLASS SHEETS
Filed March 18, 1963  3 Sheets-Sheet 3

INVENTORS
James E. Mambourg and
BY William E. McCown
Nobbe & Swope
ATTORNEYS

United States Patent Office 3,314,776
Patented Apr. 18, 1967

3,314,776
APPARATUS FOR CONTINUOUS PRODUCTION OF GLASS SHEETS
James E. Mambourg, Shreveport, La., and William E. McCown, Toledo, Ohio, assignors to Libbey-Owens-Ford Glass Company, Toledo, Ohio, a corporation of Ohio
Filed Mar. 18, 1963, Ser. No. 265,727
10 Claims. (Cl. 65—203)

The present invention relates to improvements in the drawing of sheet glass and more particularly to radiant heating of certain areas of the molten glass from which the sheet is drawn in order to increase the temperature uniformity in the molten glass and prevent the formation of devitrified material therein.

In the continuous drawing of sheet glass, the raw glass making ingredients are charged into the melting area of a tank furnace containing a mass of molten glass wherein they are melted and integrated into the molten mass. Thereafter, the molten materials flow successively through refining and cooling areas and into a working area from the surface of which a glass sheet or ribbon is continuously drawn upwardly according to one of several conventional processes. According to the Colburn process, for which the present invention is particularly well adapted although it is in no way limited thereto, the molten glass flows into a relatively shallow working receptacle or draw pot from which the sheet or ribbon is drawn. After traveling vertically for a short distance, the sheet or ribbon, while still in a pliable condition although substantially set in its final sheet form, is deflected about a bending roll into a horizontal plane and is then carried on a series of rolls into and through an annealing lehr.

In order to maintain the molten glass within the working receptacle or draw pot at the proper temperature for drawing, it is customary to heat the draw pot by flames from combustion burners directed into a pot chamber beneath and around the draw pot. The hot gases of combustion from the burners generally flow up over the rear wall of the draw pot and impinge directly upon the surface of the molten glass to heat the glass and prevent the formation of devitrified material or so-called "dog metal" in that area, which may adversely affect the quality of the sheet as well as its rate of draw. These hot gases are known to introduce harmful particles of dirt into the draw pot and chamber thereabove, and the gases themselves create turbulence in the atmosphere over the molten glass and surrounding the newly formed sheet which may cause temperature fluctuations and resulting variations in thickness across the sheet. Nevertheless, the benefits gained from the hot gases impinging upon the surface of the molten glass at the rear of the draw pot were thought to outweigh the disadvantages, and thus the imperfections caused thereby have until relatively recently been considered an inherent feature of such flat drawn sheet glass. According to the present invention, however, the drawing chamber and pot chamber are completely sealed off from each other and the molten glass in the rear area of the draw pot is heated by radiant heat applied to its surface.

An important object of the present invention therefore is to reduce the amount of distortion and defects in flat drawn sheet glass.

Another object of the invention is to accurately control the temperature of the molten glass at the rear of the draw pot of sheet glass drawing apparatus so as to prevent the formation of devitrified material in that area.

Still another object of the invention is to seal off the atmosphere over the molten glass in the draw pot of a sheet glass drawing apparatus from the atmosphere in the pot chamber thereof and apply heat to the molten glass at the rear of the draw pot so as to maintain the temperature of the molten glass in that area above the point at which devitrification occurs.

Yet another object of the invention is to apply radiant heat to the surface of the molten glass at the rear of the draw pot of a sheet glass furnace wherein the atmosphere over the draw pot is substantially sealed off against the entry of external gases.

Other objects and advantages will become more apparent during the course of the following description when taken in connection with the accompanying drawings.

In the drawings wherein like numerals are employed to designate like parts throughout the same:

FIG. 1 is a partial longitudinal vertical sectional view of the working end of a sheet glass furnace and annealing lehr embodying the present invention;

FIG. 2 is a fragmentary enlarged sectional view of the rear pot closure wall and radiant heating element of the invention shown in FIG. 1;

FIG. 3 is a perspective view of one section of the rear pot closure wall of FIGS. 1 and 2;

FIG. 4 is a fragmentary transverse sectional view of an alternate embodiment of the rear pot closure wall and radiant heating element;

Figure 5:
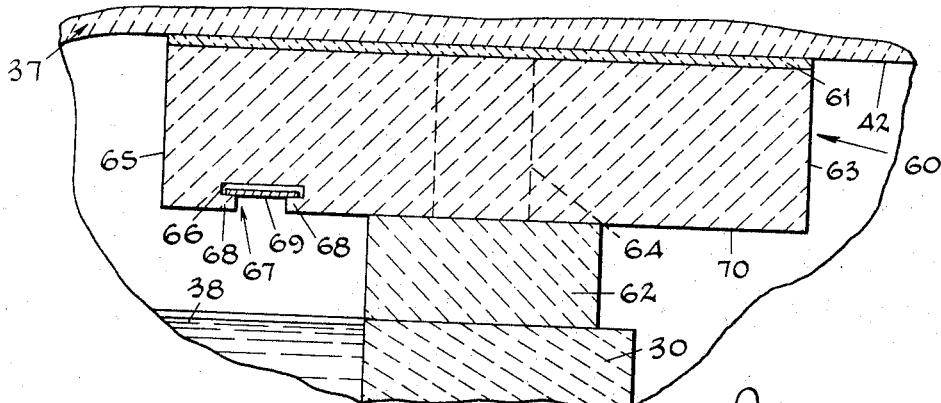
FIG. 5 is a fragmentary sectional view of another embodiment of the invention.

Referring now to FIG. 1, there is shown the working end of a sheet glass furnace designated generally by the numeral 20 and including a draw pot or working receptacle 21 for continuously receiving a supply of molten glass 22. The molten glass flows successively through melting and refining chambers (not shown) and a cooling chamber, the latter portion of which is shown at 23, where it is properly conditioned, and thence into the draw pot or working receptacle. A ribbon or sheet 24 is continuously drawn upwardly from the bath of molten glass in the draw pot through a meniscus 25 and, according to the Colburn process, after it has travelled a short distance vertically is deflected about a bending roll 26 into a substantially horizontal plane. Thereafter, the sheet travels through an enclosed annealing lehr 27 on a series of horizontally aligned machine rolls 28 wherein it is subjected to controlled cooling prior to cutting into blanks of the desired size.

The draw pot 21, which includes a floor 29, rear wall 30 and opposite side walls (not shown), is supported upon a plurality of pot stools 31. A pot chamber 32 is located beneath and around the draw pot, with the flames from burners (not shown) being introduced into the pot chamber through a rear wall 33 thereof and side walls (not shown) to assist in maintaining the molten glass within the draw pot at the proper working temperature. A substantially enclosed drawing chamber 34, separated from the atmosphere over the molten glass in the cooling chamber by an arch 35, is located over the draw pot 21 to provide a quiescent atmosphere over the molten glass therein and surrounding the newly formed sheet. It is extremely important that a quiescent atmosphere be maintained in this area in order to maintain temperature uniformity within the molten glass, particularly from side to side of the draw pot at the meniscus 25 through which the sheet is drawn. As is well known, a lack of temperature uniformity causes undesirable variations in thickness across the sheet, resulting in distorted viewing qualities.

A front lip-tile 36 positioned over the molten glass adjacent the arch 35 and a rear lip-tile 37 positioned above the rear wall 30 of the draw pot and extending over the molten glass at the rear of the draw pot serve to minimize turbulent air currents over and reduce the loss of heat from the surface 38 of the molten glass so as to maintain a more uniform temperature therein. The rear lip-tile includes a wing 39 which rests upon the top of the rear wall 33 of the pot chamber and seals off the annealing lehr 27 against the direct entry of combustion gases from the pot chamber. Sheet coolers 40 are conventionally located opposite either surface of the sheet for removing heat from the newly formed sheet to cause initial setting thereof, and pairs of knurled width maintaining rolls 41 engage the sheet at either edge above the meniscus 25 in the conventional manner to overcome the natural tendency of the sheet to narrow to a thread.

As previously described, heating of the glass at the rear of the draw pot has conventionally been caused by the action of hot combustion gases within the pot chamber 32 flowing over the top of the rear wall 30 of the draw pot and being deflected downwardly onto the surface of the molten glass by the undersurface 42 of the rear lip-tile. Thus, although the molten glass in that area is heated to a certain extent to overcome its natural tendency to cool fastest adjacent the rear wall of the draw pot, the hot gases create turbulent atmospheric conditions within the drawing chamber which adversely affect the quality of the sheet as well as introduce dirt therein.

According to the present invention, the space between the top of the rear wall 30 of the draw pot and the undersurface 43 of the rear lip-tile is closed off by a sealing block 43 extending across the width of the draw pot so as to completely seal off the drawing chamber against the entry of dirt and gases from the pot chamber. The sealing block, as shown in detail in FIG. 2, rests upon the rear wall 30 and has a beveled face 44 opposite the surface 38 of the molten glass for a purpose to be hereinafter described. A layer of insulating material 45, such as "Fiberfrax" made by the Carborundum Co. of Niagara Falls, N.Y., is located between the top of the sealing block and the undersurface 42 of the lip-tile to provide an airtight seal while allowing for contraction and expansion of those members. Although a single sealing block may extend entirely across the rear of the draw pot, it has been found preferable to form the block in a plurality of sections 46 (FIG. 3) due to the relatively high temperatures encountered which may cause an excessively long block to warp and crack, thereby reducing its effective life. The individual block sections 46 have interfitting tongues 47 and grooves 48 which form an airtight joint between adjacent blocks when in position.

Elongated recesses 49 having reduced throat sections 50 in the bevelled face of the sealing block carry heating elements 51 which extend across the draw pot and are connected to a source of electrical energy in a conventional manner (not shown) for radiating heat to the surface of the glass in the area adjacent the rear wall 30. The cross section of the heating elements, and therefore their electrical resistance, is normally kept constant across the draw pot, thus providing an extremely uniform source of heat. This uniform heat source above the molten glass will tend to decrease any temperature differentials existing across the draw pot by radiating a greater amount of heat to the colder, more viscous glass than to that which is at a higher temperature. Where relatively large differentials exist, however, the cross sectional area of one or more of the heating elements may be increased or decreased at that point, thereby decreasing or increasing the electrical resistance to provide a corresponding decrease or increase in the amount of heat applied to the molten glass in that region. This feature is particularly beneficial in providing additional heat near the edges of the draw pot to counteract the tendency of the glass to cool more rapidly adjacent the side walls.

The heating elements may be made of any suitable resistance heating material, such as "Hoskins Alloy 875" produced by the Hoskins Mfg. Co., of Detroit, Mich., and are preferably relatively thick in cross sectional dimensions in order to extend their length of life. The amount of electrical energy required to maintain the glass at the proper working temperature in any particular instance will be determined by operating conditions, but has generally been found to be in the neighborhood of about 40 kw. For reasons of safety, the voltage impressed upon the heating elements is generally kept low, being on the order of 100 volts or less.

Due to the angle between the surface 38 of the molten glass and the bevelled face 44 of the sealing block, the heat from the heating elements is directed onto the surface of the glass a short distance from the rear wall 30. A downward projection 52 on the rear lip-tile serves to retain the heat in the rear area of the pot with the undersurface 42 acting to reflect heat back into the molten glass. Thus the heat from the heating elements 51 is dissipated through the molten glass adjacent the rear wall 30 to cause uniform heating thereof across the entire width of the draw pot.

The sealing block 53 shown in FIG. 4 is essentially the same as the sealing block 43 except for the heating element mounted therein. Thus, the block 53 is generally made in a plurality of interfitting sections having tongue and groove joints 54 and rests upon the top of the rear wall 30. A layer of insulation 55 is located between the rear lip-tile and sealing block to provide an airtight seal therebetween. The forward edge of the sealing block is bevelled as at 56 to face the surface 38 of the molten glass, and a single elongated recess 57 having a restricted throat 58 extends across the sealing block and carries therewithin a heating element 59 similar to the heating element 51 of the previously described embodiment. The single heating element 59 is generally somewhat wider than the individual elements 51 to give a larger radiating area although, of course, both the width and number of heating elements will be determined by the amount of heat which it is necessary to add and will vary from one furnace to another. It will be understood that while one or two such heating elements have been shown, the number may be increased where operating conditions warrant.

Ribbon type heating elements possess an advantage in that they present a relatively large area for radiation of heat to the glass. The ribbon should be of sufficient thickness, however, to prevent it from burning out and to insure a relatively long operative life. For example, such heating elements of Hoskins Alloy 875 having a thickness of from one-eighth to one-quarter inch have been found particularly well suited for this purpose.

There has been shown in FIG. 5 an embodiment of the invention wherein the heating element is located directly above the molten glass and spaced slightly inwardly from the rear wall of the draw pot. It has been found desirable to apply the heat a short distance away from the rear wall instead of concentrating it immediately adjacent the wall, so that the heat may be better dissipated through the glass to cause more uniform heating thereof. This is accomplished in the embodiments of FIGS. 2 and 4 by locating the heating element or elements in the bevelled face of the sealing block. In the embodiment of FIG. 5, a sealing unit 60 and layer 61 of insulating material close the space between the top of the rear wall 30 and undersurface 42 of the lip-tile. The sealing unit includes a row of refractory bricks 62 resting on the wall 30 and a plurality of interfitting blocks 63 having tongue and groove joints 64. Of course, the bricks 62 and blocks 63 may be cast as a unit if desired, but for purposes of simplicity and economy they are preferably made separately. The blocks 63 project forwardly over the molten glass at 65 and an elongated recess 66 having a restricted opening 67 formed by depending lips 68 extends thereacross for receiving a resistance heating element 69. The heating element is slidably received within the recess and rests upon the depending lips which form the restricted opening. The blocks 63 also project rearwardly at 70 over the bricks 62 so as to counterbalance the forward projection 65. The heating element is connected to a suitable electrical source (not shown).

Figures 6, 7:
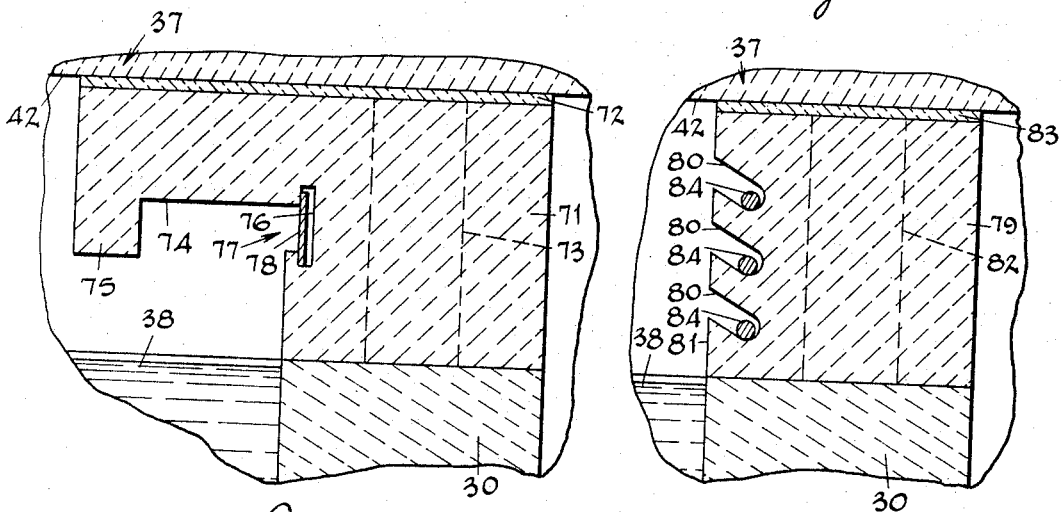
FIG. 6 is a fragmentary sectional view of still another embodiment of the invention.
FIG. 7 is a fragmentary transverse sectional view taken through a rear pot closure wall embodying a different type of radiant heating element.

In the embodiment of FIG. 6, a sealing block 71 resting upon the rear wall 30 of the pot and a layer 72 of insulating material between the sealing block and lip-tile 37 seal off the drawing chamber from the pot chamber. The sealing block is comprised of a plurality of interfitting sections having tongue and groove joints 73 and has a flange 74 projecting over the molten glass. A lip 75 depends downwardly from the flange for a purpose to be described, and an elongated recess 76 having a restricted throat 77 carries a heating element 78 therein. The heating element, connected to a suitable source of electricity (not shown), directs heat generally parallel to the surface 38 of the molten glass. The lip 75 and undersurface of the flange 74 direct this heat downwardly toward the glass and retain a major portion of the heat in the vicinity of the rear wall of the draw pot where it is most effective in maintaining a uniform temperature in the molten glass and preventing devitrification. The embodiments of FIGS. 2, 4, 5 and 6 have an added advantage in that a portion of the refractory sealing block is located between the heating element and rear lip-tile so as to reduce the loss of heat from the heating elements through the lip-tile thereabove.

A further modification is shown in FIG. 7 wherein a sealing block 79 has inclined elongated slots 80 in its face 81 opposite the surface of the molten glass. The sealing block is composed of a plurality of sections having interfitting tongue and groove joints 82 and a layer of insulating material 83 is interposed between the sealing block and lip-tile to complete the sealing off of the drawing chamber and pot chamber. Heat is provided by resistance elements 84 located in the slots 80 and extending across the width of the draw pot, the elements being connected to suitable sources of electrical energy (not shown). For purposes of illustration, three heating elements have been shown, the heating elements being circular in cross section. It will be understood, of course, that the number of heating elements may vary according to heating requirements and that the elements may be other than circular in cross section. In any event, the heat from the elements is deflected downwardly to the molten glass by the undersurface 42 of the lip-tile.

Figure 8:
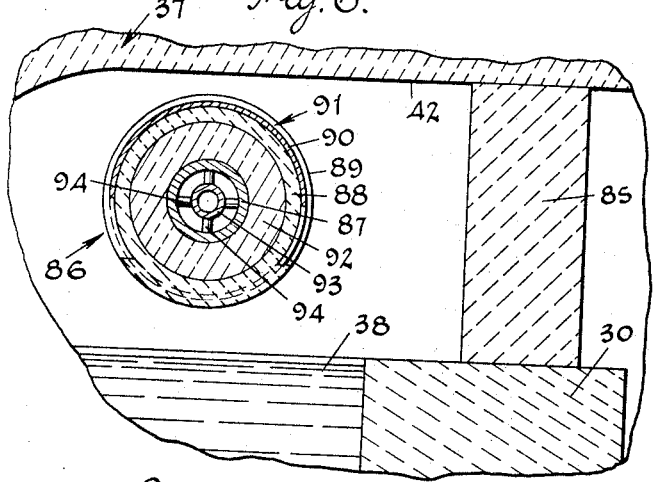
FIG. 8 is a transverse sectional view through still another embodiment of the invention utilizing a radiant heating member separate from the rear closure wall.
Figure 9:
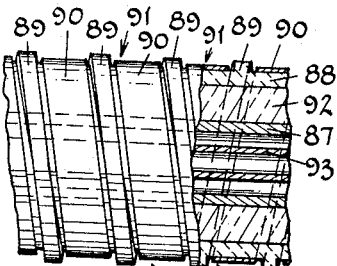
FIG. 9 is a fragmentary elevational view, with parts broken away, of the radiant heating element of FIG. 8.

The modification of FIGS. 8 and 9 differs from the previously described embodiments in that the sealing block 85 and heating unit 86 thereof are separate units, with the heating unit extending transversely across the draw pot a short distance inwardly from the rear wall 30 thereof, and being supported in any conventional manner (not shown) at its ends. The heating unit thus may be moved toward or away from the end wall 30 and may be raised or lowered independently of the sealing block in response to changing operating conditions to achieve maximum utilization of the heat. The space between the draw pot rear wall and rear lip-tile 37 is thus sealed off in any suitable manner, such as by the refractory bricks or blocks 85, to prevent the entry of gases of combustion into the drawing chamber from the pot chamber 32.

The heating unit 86 includes a central tubular beam 87 which acts as the structural support for the unit, and a concentric cylinder 88 of somewhat larger diameter having a spiral rib 89 thereon. An electrical resistance heating element 90 is wound on the cylinder 88 in the valleys 91 between adjacent convolutions of the spiral ribs 89, with its ends connected to a suitable source of electrical energy (not shown) at opposite sides of the furnace. The space between the cylinder 88 and tubular beam 87 is filled with an insulating material 92 such as "Fiberfrax" to reduce the amount of heat transmitted to the beam 87. A conduit 93 is positioned concentrically within the beam 87 by spacers 94 and is connected to an external source for continuously circulating a cooling medium therethrough in the conventional manner to maintain the temperature of the tubular beam 87 below that at which its strength would be impaired. Thus, the cooling medium generally enters at one end of the beam and travels through the beam in the conduit 93. When it reaches the opposite end of the beam, the cooling medium is discharged into the space between the conduit and inner surface of the beam 87 through which it travels back to the starting end where it is discharged.

The heating element 90 may be made of Hoskins Alloy 875 or any other suitable material as are the previously described heating elements. Inasmuch as the cylinder 88 is subjected to relatively high temperatures, it is generally made of a ceramic electrically nonconducting material. A portion of the heat generated by the heating element is radiated directly to the molten glass while the lip-tile 37 and sealing block 85 serve to retain the remainder of the radiated heat in the vicinity of the rear wall of the draw pot.

Figure 10:
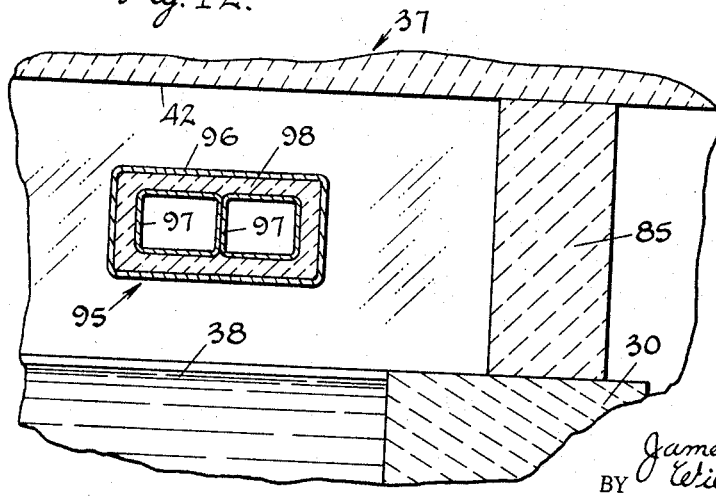
FIG. 10 is a transverse sectional view of an embodiment of the invention similar to FIG. 8 but having a modified radiant heating element.

The embodiment of FIG. 10 is very similar to that of FIG. 8 except that the heating unit 95 is of a somewhat different construction. Thus the heating element itself is a tubular member 96 which extends transversely across the draw pot and is connected at its ends to a source of electrical energy (not shown). The heating element is generally made of a material such as "Inconel," produced by the International Nickel Co. of New York, N.Y., so that when electrical energy is applied thereto, it will attain a temperature sufficient to radiate the desired amount of heat to the molten glass without excessive corrosion and while retaining a considerable amount of structural strength. A potential of about 13 volts producing a current of about 3800 amps in the heating element has, for example, been found generally adequate for this purpose. Interconnected conduits 97 within the heating element are mounted at their ends in a suitable manner (not shown) so as to act as beams to support the heating unit and permit vertical and horizontal adjustment thereof, and a cooling fluid is continuously circulated therethrough to maintain the conduits at a safe operating temperature. The space between the conduits and the heating element 96 is filled with insulation 98 to reduce heat transfer to the cooling medium.

The heating unit 95 has been found to be extremely durable. Since the external tubular member 96 is made from a high grade metal alloy, the unit is not susceptible to cracking or disintegrating as are refractory materials, and therefore it does not deposit particles of foreign matter upon the molten glass as refractory members have a tendency to do. The unit possesses great strength due to the nature of its construction, and thus does not warp or sag during use. As shown in FIG. 10, it is preferably rectangular in cross section with its lower face parallel to the upper surface 38 of the molten glass, thus heating the glass uniformly across the rear area of the draw pot over a relatively large area.

Figure 11:
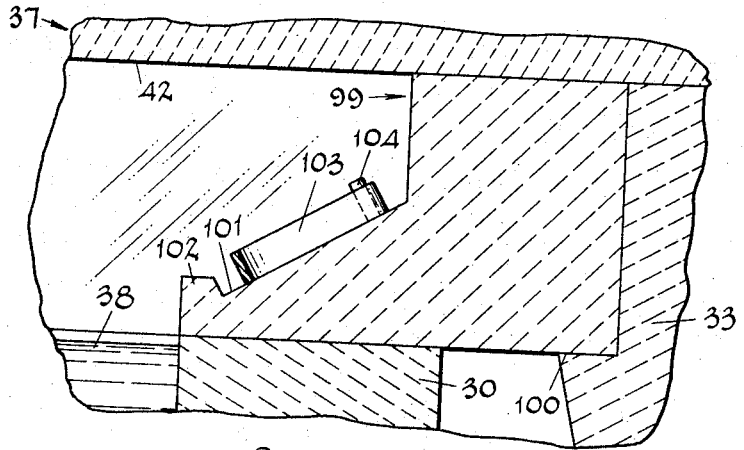
FIG. 11 is a transverse sectional view of another embodiment of the rear pot closure wall and heating element.
Figure 12:
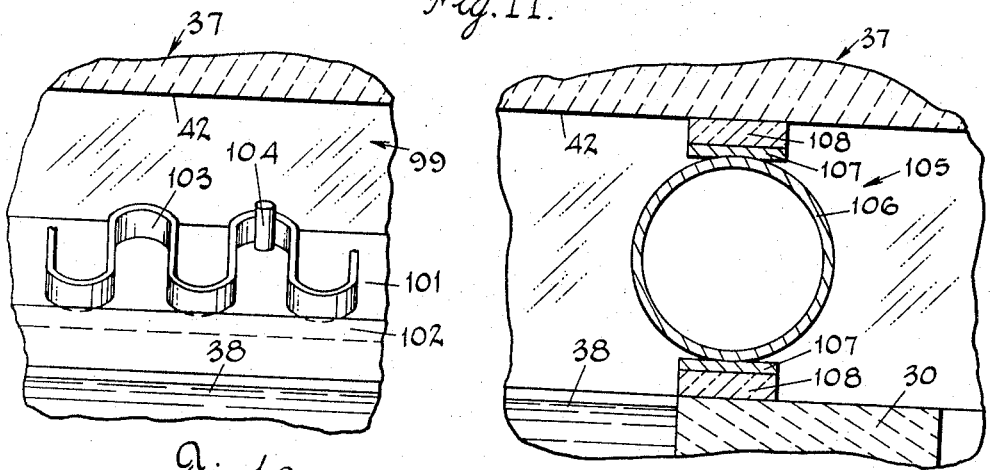
FIG. 12 is a fragmentary elevational view of the embodiment of FIG. 11, showing the radiant heating element of the invention.

Another embodiment of the invention is disclosed in FIGS. 11 and 12 wherein a sealing block 99 extends across the rear of the draw pot and rests upon the rear wall 30 thereof and a ledge 100 on the pot chamber rear wall 33 in a manner to close off the space between the draw pot rear wall and the rear lip-tile 37. It will be understood that although not shown, a layer of insulation may be inserted between the sealing block and lip-tile if necessary, and the sealing block may be made in a plurality of interfitting sections having tongue and groove joints as in the earlier described embodiments. The sealing block has an inclined shelf 101 from which projects a lip 102. A heating element 103 is positioned upon the shelf 101 by a series of pegs 104 and connected to a suitable source of electrical energy (not shown). The heating element is preferably serpentine in configuration, as best shown in FIG. 12, in order to increase the heating area thereof across the draw pot and to better distribute the heat, although it is contemplated that other types of heating elements may be employed. Where operating conditions warrant, additional localized heating may be provided by spacing the convolutions of the heating element closer together in certain areas, and conversely, the relative intensity of the heating in certain regions may be reduced by spacing the convolutions farther apart in the appropriate area.

The heating element 103 is so positioned that the lip 102 prevents heat from being radiated directly to the surface of the glass immediately adjacent the rear wall 30. Instead, the heat is reflected from the undersurface 42 of the lip-tile whereby it is diffused to uniformly heat the molten glass in the rear area of the draw pot. The lip 102 serves the additional purpose of preventing particles of dirt such as scale from the heating element and refractory material from the sealing block from dropping off the inclined shelf 101 into the molten glass.

Figure 13:
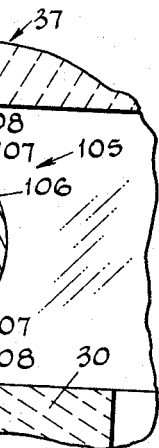
FIG. 13 is a transverse sectional view of a modified form of the invention utilizing a gas fired radiant heating tube.

There is shown in FIG. 13 an embodiment of the invention utilizing gas as the source of heat. Thus, a gas fired radiant heating unit 105 extends across the rear of the draw pot in the space between the wall 30 and the lip-tile 37 and seals off the drawing chamber from the pot chamber. The heating unit includes a radiant heating tube 106 having opposed plates 107 affixed thereto which maintain the tube in position between blocks 108. The open ends of the radiant tube extend outside of the enclosed drawing chamber and conventional gas fired burners (not shown) are inserted therein. The tube 106 thus radiates heat to the molten glass while excluding the gases of combustion, both from the pot chamber 32 and the burners inserted in the ends of the radiant tube 106, from the forming chamber. It is contemplated that an insulating member such as the block 85 of the embodiment of FIG. 10 may be placed behind the heating tube to increase the amount of heat directed into the working receptacle if desired.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

We claim:

1. Apparatus for the continuous production of window glass comprising, in combination, a draw pot having a rear wall and opposite side walls, melting, refining and cooling chambers in end-to-end communicating relationship for continuously supplying molten glass to said draw pot, a substantially enclosed drawing chamber above and in communication with said draw pot, a pot chamber beneath and around said draw pot, means for introducing hot gases of combustion into said pot chamber, a lip-tile extending across the rear of said draw pot above said rear wall and molten glass, a radiant heating tube extending across the draw pot between said lip-tile and said rear wall and substantially sealing off the space therebetween to prevent entry of gases of combustion from said pot chamber into the space between said lip-tile and said molten glass and into said drawing chamber, the ends of said radiant tube extending outside of said enclosed drawing chamber, gas fired burners inserted in the ends of said radiant tube for supplying heat to the surface of the molten glass to maintain a uniform temperature in said molten glass across said draw pot and prevent the formation of devitrified material in said rear area while excluding gases of combustion from said drawing chamber, and means for drawing a sheet upwardly from the molten glass in the draw pot through said drawing chamber.

2. Apparatus for the continuous production of window glass comprising, in combination, a draw pot having a rear wall and opposite side walls, melting, refining and cooling chambers in end-to-end communicating relationship for continuously supplying molten glass to said draw pot, a substantially enclosed drawing chamber above and in communication with said draw pot, a pot chamber beneath and around said draw pot, means for introducing hot gases of combustion into said pot chamber, a lip-tile extending across the rear of said draw pot above said rear wall and the molten glass, a sealing block extending upwardly from said lip-tile and said rear wall to substantially seal off the space between said lip-tile and said rear wall and prevent the entry of gases of combustion from said pot chamber into the space between said lip-tile and said molten glass and into said drawing chamber, radiant heating means in the rear area of said draw pot including at least one electrical resistance heating element extending across said draw pot along the face of said sealing block and beneath said lip-tile for supplying heat to the surface of the molten glass to maintain a uniform temperature in said molten glass across said draw pot and prevent the formation of devitrified material in said rear area, and means for continuously drawing a sheet upwardly from the molten glass in the draw pot through said drawing chamber.

3. An apparatus for the continuous production of window glass as claimed in claim 2, wherein said means for carrying the heating element comprises a bevelled face inclining upwardly over and opposite the surface of the molten glass, said bevelled face having an elongated recess therein for receiving said heating element whereby heat from said heating element is directed onto the surface of the molten glass a short distance inwardly from said rear wall.

4. An apparatus for the continuous production of window glass as claimed in claim 2, wherein said means for carrying the heating element comprises a horizontal projection extending over the molten glass beneath and contiguous with said lip-tile, said horizontal projection having an elongated recess in the lower face thereof spaced inwardly from said rear wall for receiving said heating element whereby said horizontal projection reduces heat loss from said heating element through said lip-tile.

5. An apparatus for the continuous production of window glass as claimed in claim 2, wherein said sealing block includes a horizontal flange projecting from the body portion of said block and extending over the molten glass beneath said lip-tile, said means for carrying the heating element comprising an elongated slot at the junction of said flange and body portions, and a lip depending downwardly from said flange for retaining heat from said heating element in said rear area.

6. An apparatus for the continuous production of window glass as claimed in claim 2, wherein the face of said sealing block opposite the molten glass is substantially vertical, said heating element being received in an elongated slot in said vertical face, said elongated slot being inclined upwardly toward said lip-tile whereby the heat from said element is reflected onto the surface of the molten glass by the undersurface of said lip-tile.

7. An apparatus for the continuous production of window glass as claimed in claim 2, wherein said sealing block includes a shelf inclining upwardly and away from the molten glass, said heating element being supported upon said inclined shelf.

8. An apparatus for the continuous production of window glass as claimed in claim 14, said resistance heating element being supported upon said inclined shelf whereby the heat from the element is reflected from the undersurface of the lip-tile to the surface of the molten glass, the heating element being serpentine in configuration wtih the convolutions thereof being more closely spaced in certain predetermined areas than in other areas to provide additional localizing heating in said predetermined areas.

9. An apparatus for the continuous production of window glass as claimed in claim 2, wherein said radiant heating means comprise a tubular member extending across said draw pot above the molten glass slightly inwardly from said rear wall, said tubular member having a spiral external rib thereon, an electrical resistance heating element spirally wound upon said tubular member between adjacent convolutions of said spiral rib, and means for circulating a heat absorbing medium through the interior of the tubular member to remove heat therefrom.

10. An apparatus for the continuous production of window glass as claimed in claim 2, wherein said radiant heating means comprises a tubular resistance heating element extending across said draw pot above the molten glass and inwardly from said rear wall, a conduit extending longitudinally within said tubular element, means for circulating a heat absorbing medium through the conduit to control the temperature of said conduit, and insulating means between the interior surface of the conduit and the interior surface of the tubular element to reduce heat transfer between said tubular element and conduit.

References Cited by the Examiner

UNITED STATES PATENTS

| | | | |
|---|---|---|---|
| 849,531 | 4/1907 | Colburn et al. | 65—205 X |
| 1,234,973 | 7/1917 | Trood | 65—40 |
| 1,391,406 | 9/1921 | Rhonemus | 65—205 X |
| 1,606,409 | 11/1926 | Fowle | 65—205 X |
| 1,685,226 | 9/1928 | Burdick | 13—25 |
| 2,139,201 | 12/1938 | Nordstrom | 13—25 |
| 2,228,101 | 1/1941 | Willmann | 338—53 |
| 2,397,408 | 3/1946 | Crosby et al. | 338—53 |
| 2,691,247 | 10/1944 | Henry et al. | 65—205 X |
| 2,744,987 | 5/1956 | Marvin | 338—303 |
| 2,862,091 | 11/1958 | Seifert | 13—25 |
| 3,240,584 | 3/1966 | Zellers | 65—205 |
| 3,241,940 | 3/1966 | Zellers | 65—205 |

DONALL H. SYLVESTER, *Primary Examiner.*

D. CRUPAIN, G. R. MYERS, *Assistant Examiners.*